(12) United States Patent
VanderMey et al.

(10) Patent No.: US 7,159,817 B2
(45) Date of Patent: Jan. 9, 2007

(54) VERTICAL TAKE-OFF AND LANDING (VTOL) AIRCRAFT WITH DISTRIBUTED THRUST AND CONTROL

(76) Inventors: Timothy VanderMey, 1352 Charlotte St., Altamonte Springs, FL (US) 32701; Josiah VanderMey, 1352 Charlotte St., Altamonte Springs, FL (US) 32701

( * ) Notice: Subject to any disclaimer, the term of this patent is extended or adjusted under 35 U.S.C. 154(b) by 0 days.

(21) Appl. No.: 11/035,263

(22) Filed: Jan. 13, 2005

(65) Prior Publication Data

US 2006/0151666 A1 Jul. 13, 2006

(51) Int. Cl.
*B64C 15/00* (2006.01)
*B64C 29/00* (2006.01)

(52) U.S. Cl. .................. 244/12.1; 244/17.23
(58) Field of Classification Search ........ 244/12.1, 244/6, 12.2, 12.3, 12.4, 12.6, 12.7, 17.13, 244/17.23, 21
See application file for complete search history.

(56) References Cited

U.S. PATENT DOCUMENTS

| | | | | |
|---|---|---|---|---|
| 1,003,885 A * | 9/1911 | Day | | 244/6 |
| 1,023,534 A * | 4/1912 | Spencer | | 244/6 |
| 1,417,884 A * | 5/1922 | Bernier | | 244/6 |
| 1,425,555 A * | 8/1922 | Thompson | | 244/6 |
| 1,652,554 A * | 12/1927 | Bolgiano | | 244/6 |
| 1,738,423 A * | 12/1929 | Covatch | | 244/6 |
| 1,987,788 A * | 1/1935 | Morton | | 244/56 |
| 2,403,936 A * | 7/1946 | Loback | | 244/6 |
| 2,540,404 A * | 2/1951 | Neale | | 244/17.11 |
| 3,119,577 A * | 1/1964 | Andrews | | 244/7 R |
| 3,161,374 A * | 12/1964 | Allred et al. | | 244/12.3 |
| 3,647,315 A * | 3/1972 | Rostad et al. | | 416/31 |
| 3,693,910 A * | 9/1972 | Aldi | | 244/7 A |
| 3,856,238 A * | 12/1974 | Malvestuto, Jr. | | 244/5 |
| 5,992,796 A * | 11/1999 | Smith | | 244/45 A |
| 6,293,491 B1* | 9/2001 | Wobben | | 244/17.23 |
| 6,467,726 B1* | 10/2002 | Hosoda | | 244/60 |
| 6,471,158 B1* | 10/2002 | Davis | | 244/8 |
| 6,622,962 B1* | 9/2003 | White | | 244/7 R |
| 2006/0151666 A1* | 7/2006 | VanderMey et al. | | 244/12.3 |

* cited by examiner

*Primary Examiner*—Teri Pham Luu
*Assistant Examiner*—Stephen A Holzen
(74) *Attorney, Agent, or Firm*—Ober/Kaler; Royal W. Craig

(57) ABSTRACT

An aircraft having a vertical take-off and landing (VTOL) propulsion system. The aircraft includes a fuselage, the VTOL propulsion system, at least one forward thruster, a power source used for both the VTOL propulsion system and forward thruster, fore and aft wings and a plurality of spars attached to and spanning the space between the two wings. The VTOL propulsion system includes a plurality of VTOL cells (including a motor, motor controller, and propeller) attached in a spaced relation along each spar. The VTOL cells are used exclusively for vertical flight or hovering and are powered down as the aircraft develops forward flight velocity and corresponding wing lift. During forward flight the VTOL propellers are articulated to allow the aircraft to take on a low drag configuration. The present invention is suitable for use in manned or un-manned aircraft of any scale.

48 Claims, 10 Drawing Sheets

VERTICAL TAKE-OFF AND LANDING (VTOL) AIRCRAFT WITH DISTRIBUTED THRUST AND CONTROL

BACKGROUND OF THE INVENTION

1. Field of the Invention

The present invention relates to aircraft propulsion systems and, more particularly, to a vertical take-off and landing (VTOL) propulsion system for aircraft that employs a distributed system of lifting propellers to achieve vertical take-off and landing as well as highly efficient forward flight.

2. Description of the Background

There are a variety of existing vertical take-off and landing ("VTOL") aircraft in use today. For example, helicopters are VTOL aircraft. However, because of its retreating blade and its basic construction the forward flight speed and efficiency of a conventional helicopter is significantly inferior to that of a conventional fixed wing aircraft. Additionally, the complexity of the helicopter's mechanical linkages contributes significantly to the crafts high cost and demanding maintenance requirements.

More recent efforts to improve the forward flight speed of vertical take-off and land aircraft are geared toward articulating rotors and/or wings or other toward other means of vectoring thrust. The V-22 Osprey is a twin rotor helicopter with rotors that tilt forward. The Harrier AV 8A accomplishes vertical and horizontal thrust by articulating movable nozzles, which are used to vector the thrust from its turbofan engines. The Lockheed Martin Joint Strike Fighter (JSF) concept is described by Bevilaqua and Shumpert in U.S. Pat. No. 5,209,428 dated May 11, 1993. The Lockheed Martin JSF has a 3-bearing swivel duct, a variable nozzle, and lift fan. The Boeing JSF concept is described by Burnham et al. in U.S. Pat. No. 5,897,078 dated Apr. 27, 1999. This aircraft has rotational lift nozzles near the center, and yaw, pitch and roll nozzles that stabilize the aircraft in a hover. The aircraft uses an F-119 derivative engine, positioned near the air intake. Other efforts include Bollinger in U.S. Pat. No. 5,275,306 dated Jan. 4, 1994, who describes an aircraft with a horizontal lift fan driven by exhaust air. Zimmerman in U.S. Pat. No. 3,972,490 dated Aug. 3, 1994 describes a tri-fan powered VTOL aircraft that uses turbo-fans and has a horizontal lift fan in the nose of the aircraft. Other examples of this type of aircraft include the Bell XV-3, the Curtis-Wright X-100 and the Curtis-Wright X-19, U.S. Pat. No. 6,343,768 by Muldoon, U.S. Pat. No. 5,839,691 by Lariviere, and U.S. Pat. Application Pub. No. 2003/0080242 by Kawai.

The tilt rotor aircraft designs mentioned above attempt to combine the forward flight dynamics of a fixed wing aircraft with the vertical take off and land capabilities of a helicopter. However, tilt rotor aircraft have several distinctive drawbacks. The first notable drawback is that tilt rotor aircraft must overcome negative angular moments created by tilting their spinning rotors 90 degrees during VTOL transitions. These angular moments produce a nose up force when transitioning from vertical to horizontal flight and a nose down force when transitioning from horizontal to vertical flight. These forces create inherently unstable conditions during the transitions between vertical and horizontal flight and visa versa. In actual practice, this inherent instability has been largely responsible for a poor safety record for this type of aircraft. A second drawback of the tilt rotor design is the fact that if the propulsion rotation system should fail the craft is rendered incapable of landing as a conventional fixed wing aircraft. This occurs because the rotors are so large that they would strike the ground if the aircraft were to be landed like a conventional fixed wing aircraft, with the propellers spinning on a horizontal axis. Ducted fan aircraft such as the X-22, the NORD 500 and the Doak 16 reduce the swept area of the propulsion system and allow the aircraft to take off and land horizontally. However, in forward flight the ducted fans build up a boundary layer of air immediately in front of the ducts. This limits their forward speed roughly to that of helicopters.

In U.S. Pat. No. 5,178,344 Dlouhy describes a craft with exposed rotors around the periphery of the aircraft. This craft has a high drag profile and is unsuited for high efficiency forward flight.

High velocity vectored thrust aircraft like the previously mentioned Harrier jet as well aircraft like those shown in U.S. Pat. No. 5,115,996 by Moller, U.S. Pat. No. 4,071,207 by Piasecki, and U.S. Pat. Application Pub. No. 20030062443 by Wagner et al. (specifically their configuration show in FIG. 12) all suffer from at least four major drawbacks. Since vertical and horizontal thrust are controlled by vectoring a common air stream the vertical thrust and horizontal thrust cannot be controlled independently. This interdependence causes serious control and stability issues during VTOL transitions. Secondly, since thrust is gained by vectoring high velocity air, the high velocity air stream will kick up any loose objects in its immediate proximity during take off and landing. This phenomenon can pose a hazard to the aircraft and to ground personal. Thirdly, since high velocity air is used to generate the lifting thrust, more power is required for vertical take off and landing than would be for an aircraft that generates its thrust over a larger area with a slower velocity air stream (i.e. a helicopter). Because of this, not only must the aircraft power plant be capable of supplying the required additional power, but the large amount of fuel used during take off and land negatively affects the aircraft's effective range and flight time. Fourthly, vectored thrust aircraft whose thrust jets are located in close proximity to one another do not provide a wide and stable "base" for the aircraft to balance on and are inherently unstable in hover.

Another type of fixed wing VTOL aircraft is the tail setter. Tail setters rest on their tails and take off and land vertically, rotating the entire craft by 90 degrees to enter and exit forward flight. As with the tilt rotor aircraft, the lack of aerodynamic lift and the negative angular moment caused by tilting the craft with its spinning rotors causes significant instability issues when transitioning between vertical and horizontal flight (and visa versa). Additionally, for piloted aircraft, the tail setter provides the pilot with limited situational awareness during VTOL transitions and hover. Examples of tail setter aircraft include, U.S. Pat. Application Pub. No. 2002/0074452 by Ingram, U.S. Pat. No. 5,863,013 by Schmittle, U.S. Pat. No. 5,758,844 by Cummings, U.S. Pat. No. 5,086,993 by Wainfan, U.S. Pat. Application Pub. No. 2002/0074452 by Ingram, and U.S. Pat. Application Pub. No. 2003/0006339 by Capanna.

Still another type of fixed wing VTOL aircraft employs vertically oriented ducted fans or jets in the in the wing of the craft. This type of aircraft typically suffers from several significant drawbacks. First, if the craft has only a few small fans, high velocity air is required for sufficient thrust thus resulting in the hazards and inefficiencies previously noted for the vectored thrust aircraft. If, however, the fan area is large the area taken by the fans will significantly impair the ability of the wing to develop lift during the transition time, when maximum lift is most needed. Furthermore, if the openings are large, they must be shuttered with louvers in order to reduce the induced drag of the opening during forward flight. This requirement for shuttering the fans during VTOL transitions adds further complexities and instabilities to the aircraft, particularly when transitioning from vertical to horizontal flight and visa-versa. A second major drawback of the fan-in-wing aircraft is that the wings must be thicker than normal in order to house the ducted fans and their associated power transmission or power generation components. The drag induced by the thicker wing geometry will limit forward flight speed and efficiency.

U.S. Pat. No. 5,890,441 by Swinson et al. discloses a design with large ducted fans positioned in the body of the aircraft, not in the wing. However, due to the large vertical openings and the wide fuselage body, the craft will have a large amount of induced drag and therefore is not suited for high efficiency forward flight. Furthermore, the mechanical linkage complexities required to control the aircraft rival that of a helicopter, thus bringing with them the same maintenance and reliability issues found with the helicopter.

There are also non-winged versions of the vertical ducted fan concept, such as U.S. Pat. No. 6,568,630 by Yoeli, U.S. Pat. No. 5,653,404 by Ploshkin, and U.S. Pat. No. 6,179,247 by Milde. Since these non-winged craft derived the majority of their lifting force from vertical thrust, they are inherently inefficient in regards to forward flight when compared to a conventional fixed wing aircraft.

A major drawback of nearly all of the foregoing tilt rotor and tilt-duct designs is that the aircraft is unable to fly at all if one engine should fail. Moreover, the complexity and costliness of such aircraft have been extreme. The aviation industry has long sought to improve these existing tilt-rotor and tilt-duct designs, most importantly improving reliability and safety, speed and range, and reducing or eliminating the risk of stalling. To date the foregoing and all other known attempts have fallen short of at least one of these goals.

SUMMARY OF THE INVENTION

It is, therefore, an object of the present invention to provide a vertical take-off and landing (VTOL) propulsion system for aircraft that employs a distributed system of lifting propellers to achieve vertical take-off and landing as well as highly efficient forward flight.

It is another object to provide a VTOL aircraft that is highly reliable, safe, easy to fly, capable of taking off and landing vertically, hovering and transitioning to and from horizontal flight without the risk of stalling, and capable of flying horizontally with the forward flight speed and efficiency of a conventional fixed wing aircraft.

More specific advantages of the proposed aircraft include the following:

Simplicity (Cellular construction)
Reliability (High redundancy and distributed control, mechanical simplicity)
Ease of Maintenance (Cellular "Plug and Play" Servicing)
Safety (High redundancy and distributed control)
High Stability (Large vertical thrust area and low inertia quick response rotors)
High Efficiency Hover (Low disc loading)
High Efficiency Forward Flight (Low drag fixed wing lifting surfaces)
Low Cost (Cellular=low unique parts count, Mechanical Simplicity=low cost)
Low Drag Penalty (Vertical lift propellers stow under fore to aft spar)
Low Weight Penalty (High efficiency power conversion–Small motors have high power to weight ratios and are capable of high power conductive heat dissipation when coupled to the airframe)
Fuel Cell Ready (All electric)
High Control Power (Low inertia rotors, high acceleration motors and large thrust area)
No inherent vertical to horizontal flight transition instabilities (independent vertical and horizontal thrust systems)
Redundant Power Supplies for Safety
Capable of landing under partial power as a conventional plane
No complex and inefficient vectoring mechanisms
No complex pitch control mechanisms (Fixed Pitch Rotors)
No Mechanical Power Linkages or Gears
High Efficiency Power Conversion
Pilot is not part of the dynamic stability loop
Automatic flight sequencing ready (high level command interface is ideal for remotely piloted vehicles or fully automated flight path generation)
Electrical power transmission through structural members for reduced weight
Flight maneuver limiting for safety (craft can prohibit dangerous maneuvers)

The foregoing and other objects are accomplished by a vertical take-off and landing (VTOL) propulsion system for aircraft that is capable of vertical take-off and landing as well as highly efficient forward flight. The VTOL propulsion system consists of a high plurality of lifting propellers powered by high efficiency brushless DC motors. The power for the motors is derived from an internal combustion engine and generator, a fuel cell, or other source of electrical power. A minimum of two electrical power generation units is recommended for safety and redundancy. The vertical lifting motors are used exclusively for vertical flight and are powered down as the craft develops forward flight velocity and corresponding wing lift. During forward flight the vertical lift propellers are stowed underneath the fore to aft spars allowing the craft to take on a low drag configuration. The VTOL propulsion system according to the present invention is suitable for use in manned or un-manned aircraft of any scale.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Referring in combination to FIGS. 1–5, the present invention is a vertical take off and landing (VTOL) aircraft 100 that is capable of highly efficient forward flight and incorporates a unique VTOL propulsion system.

Figure 1:
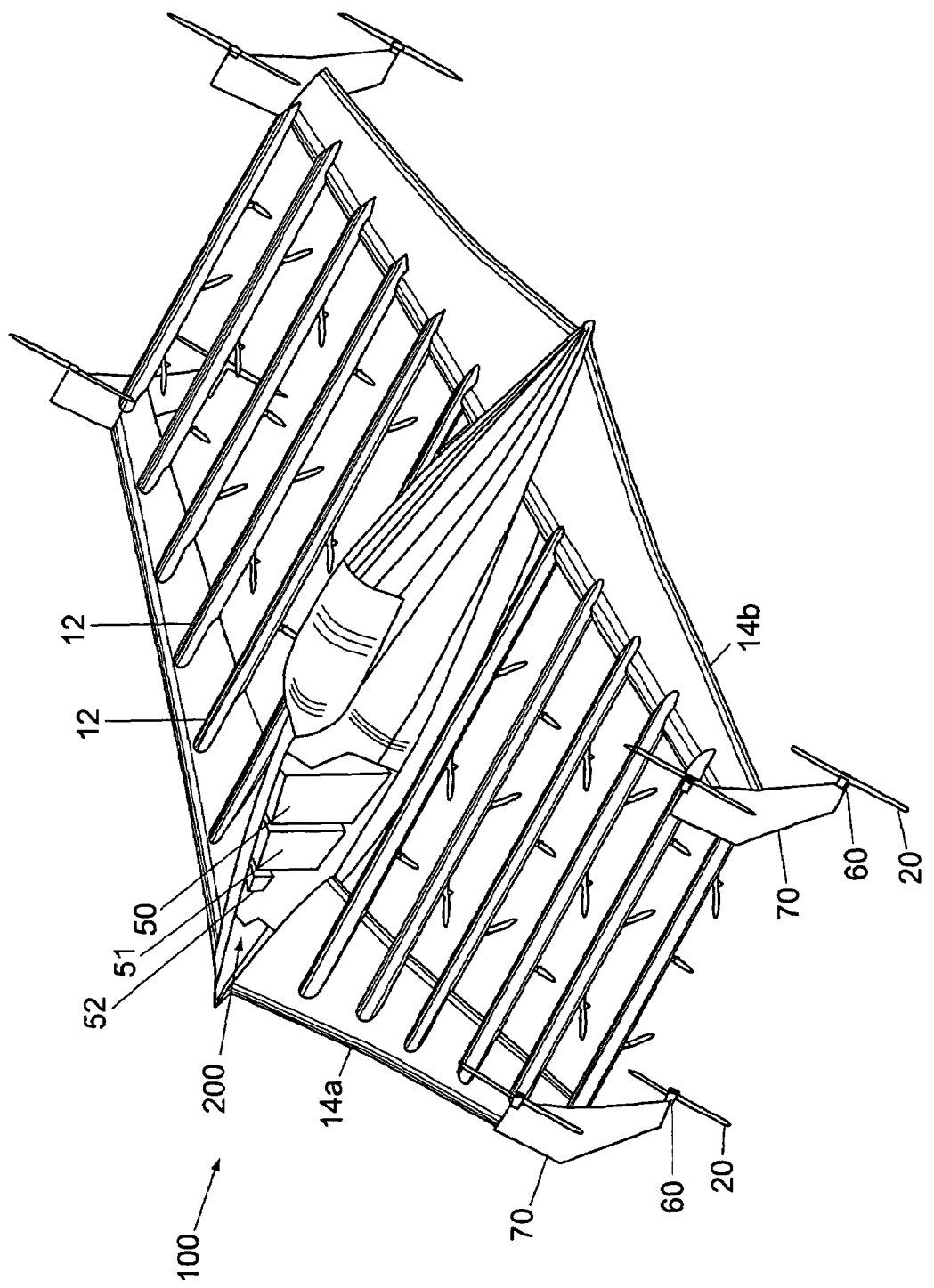
FIG. 1 is a perspective view of an exemplary vertical take-off and landing (VTOL) aircraft incorporating the propulsion system according to the present invention.
Figure 2:
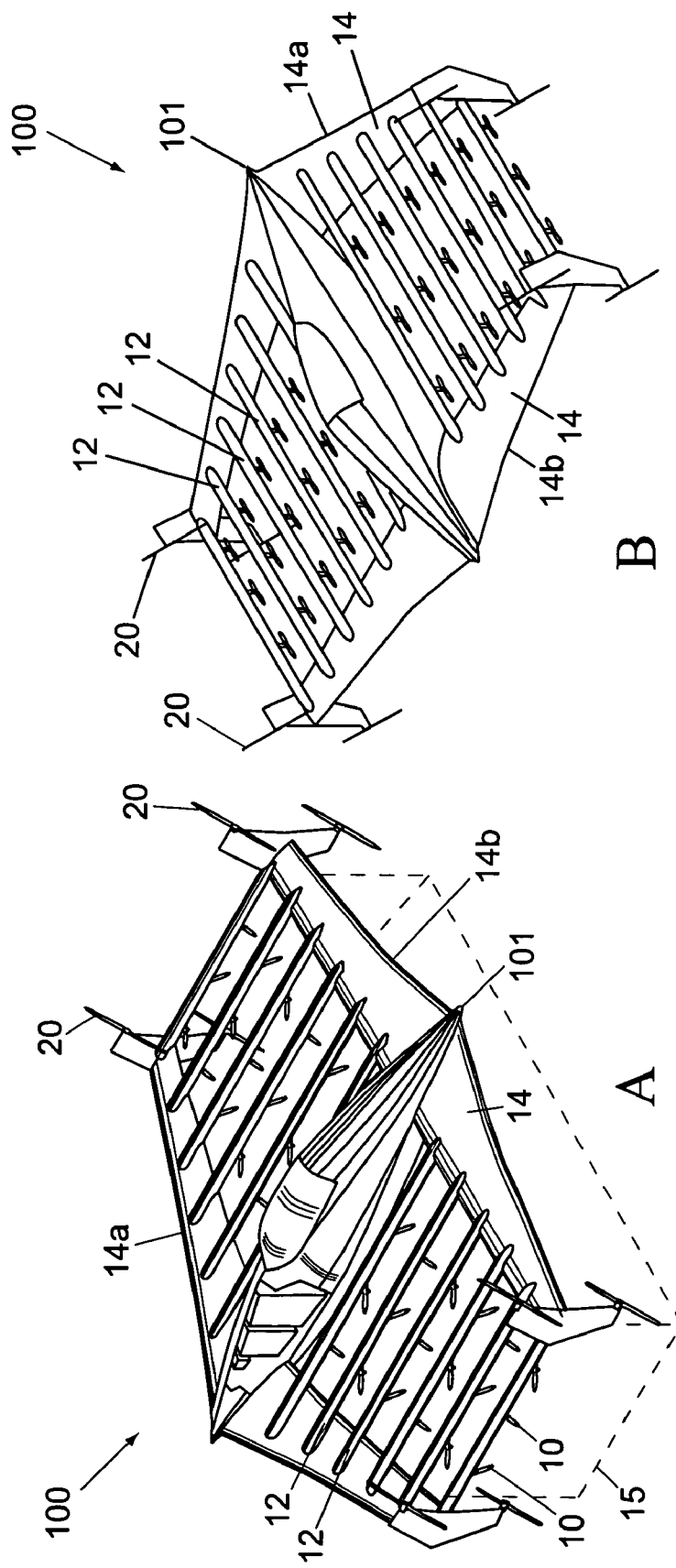
FIG. 2 is a composite illustration showing the take-off (FIG. 2A) and in-flight (FIG. 2B) configurations of the VTOL aircraft of FIG. 1.

FIG. 1 is a top view of an exemplary VTOL aircraft 100 with the unique VTOL propulsion system of the present invention incorporated therein. FIG. 2 is a composite illustration showing exemplary take-off (FIG. 2A) and in-flight (FIG. 2B) configurations of the VTOL aircraft 100 of FIG. 1.

Figure 3:
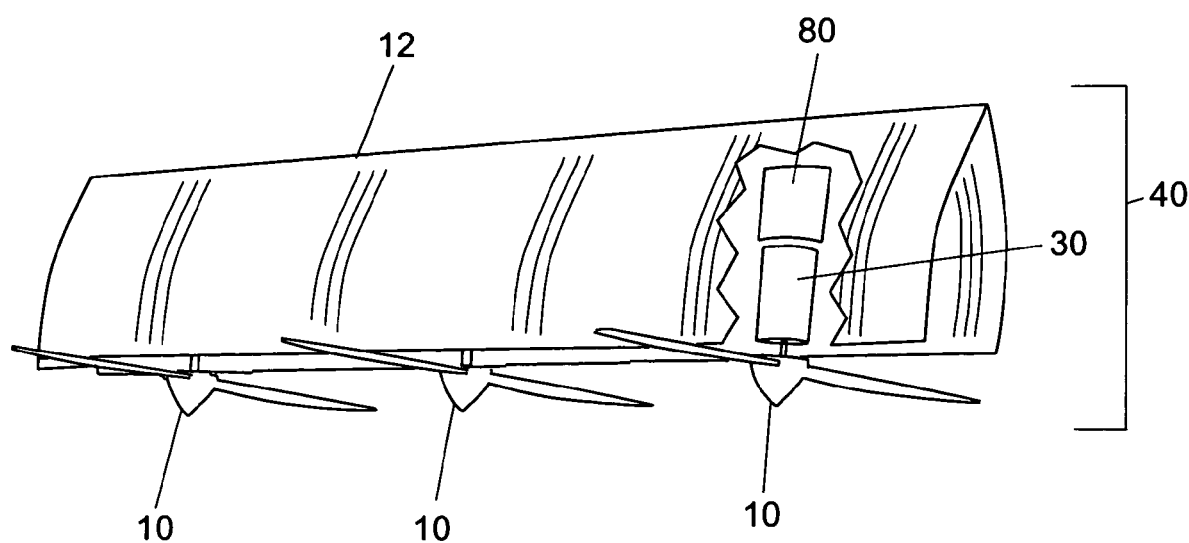
FIG. 3 is an enlarged perspective illustration of the exemplary lifting propellers 10 as in FIGS. 1 and 2A deployed in the vertical take off and landing mode.

The VTOL propulsion system of the present invention is incorporated into an aircraft 100 having fuselage 200 with wings 14a–b mounted fore and aft thereon. In the preferred embodiment, the fore wing 14a is swept and cambered to create lift during forward flight. Running fore to aft from wing 14a to 14b, (i.e. parallel to the fuselage 200), are a plurality of parallel spars 12. Generally, the VTOL propulsion system of the present invention includes a plurality of distributed lifting propellers 10 powered by high efficiency brushless DC motors 30 (in combination a single lifting propeller 10, its corresponding motor 30 and motor controller 80 are hereinafter referred to as a VTOL cell 40 and clearly depicted in exploded view of FIG. 3). The VTOL cells 40 are mounted on spars 12 and are arranged to occupy the bulk of the free space between the fore and the aft wings 14a–b. During vertical take off and landing, the propellers 10 rotate below the spars 12. Thus, the total potential area that may be swept by the lifting propellers 10 is quite large. In the illustrated embodiment as shown in FIGS. 1–3 and described herein, the VTOL propellers 10 extend out from beneath the spars 12. However, those skilled in the art of aerodynamics will recognize that the required vertical lift may also be created with the VTOL propellers extending out above the spars 12.

Using a high plurality of small low-inertia fixed-pitch lifting propellers 10 that are driven by high torque electric motors 30 over such a large area between the fore and aft wings 14a14 b (herein after referred to as the vertical lifting area 15) is advantageous over the prior art in a number of ways. First, fully utilizing the area between the fore and the aft wings 14a–b allows the craft to operate with low disc loading, thereby increasing the vertical thrust efficiencies (the lower the disc loading the higher the propeller efficiency). Second, since the vertical lifting area 15 is large, it provides a wide and stable base for the craft in vertical flight mode. Third, the horizontal plane in which the vertical lifting propellers 10 operate can also be located vertically near or above the aircraft's 100 center of gravity, depending upon the height of the fuselage 200 and the relative location of the mounted wings 14a and 14b. Setting the lifting propellers 10 near or above the aircraft's 100 center of gravity allows the aircraft 100 to have intrinsic pitch and roll stability. Fourth, since vertical lift is generated by a high plurality of small low-inertia lifting propellers 10 driven by high torque electric motors 30, the aircraft 100 has the capability to respond extremely rapidly to load or environment variations with large amounts of control power. This capability allows the aircraft 100 to have high dynamic stability in the face of aerodynamic transients such as wind shear or center of gravity transients such as payload movement. Fifth, since vertical lift, balance, and stability control does not require thrust vectoring through veins or nozzles, the losses and inefficiencies associated with vectored thrust are avoided. Sixth, because dynamic hover balance can be achieved simply by varying the speed of the individual fixed-pitch propellers 10, which are directly driven by high reliability brushless motors 30, complex mechanical pitch control mechanism are avoided along with their associated poor reliability issues. Seventh, since all power transmission is done electrically, heavy and unreliable mechanical power transmissions systems can be completely avoided. Lastly, because of the high plurality of lifting propellers 10, the aircraft 100 is intrinsically tolerant to component failures. If a single VTOL cell 40 should fail only a small portion of the lifting area is lost and the remaining cells 40 in the system are available to compensate for the loss of the single cell.

The electric power for the cells 40 may be derived from an internal combustion engine and generator, a fuel cell, or other source of electrical power 50, stored in a power storage device 51 and controlled by an intelligent controller 52 (all located within the fuselage). While a single engine/generator or fuel cell will suffice, a minimum of two electrical power generation units is recommended for safety and redundancy. The vertical lifting propellers 10 are exclusively used for vertical flight and are powered down as the craft develops forward flight velocity and corresponding wing lift.

Upon vertical take-off, forward thrust is developed by at least one forward thruster 20. In the preferred embodiment forward thrusters 20 are propellers also powered by high efficiency brushless motors 60, which in turn derive their power from the same electrical power source 50 used for powering the vertical thrust motors 30. Again referring to FIGS. 1 and 2, in the preferred embodiment a plurality of forward thrusters 20 with corresponding motors 60 are rear-mounted on vertical fins 70 attached to the wing tips of the fore and aft wings 14a–b, each fin 70 having one propeller 20/motor 60 mounted above and one below the corresponding wing 14a–b. As illustrated, the forward thrusters are comprised of pusher propellers, however, those skilled in the art will recognize that tractor propellers would serve the same purpose and be equally effective. As lift develops due to forward (horizontal) speed, power is diverted from the electrical power source 50 towards the brushless motors 60 turning the forward thrusters 20 thereby increasing forward speed and providing more lift. In preferred embodiment the vertical lift propellers are 2-blade propellers and therefore may be easily aligned underneath or enclosed within spars 12 allowing the aircraft 100 to take on a low drag configuration during forward flight (See FIGS. 4 and 5).

The VTOL propulsion system according to the present invention is suitable for use in manned or un-manned aircraft, whether under human, remote, or preprogrammed control, on any scale.

FIG. 2 is a composite illustration showing the take-off and landing (FIG. 2a) and in-flight (FIG. 2B) configuration of the VTOL aircraft of FIG. 1. Referring to FIG. 2A the VTOL aircraft 100 is in take-off/landing position with the 2-blade lifting propellers 10 free to spin on their vertical axis (the motor 30 shaft). As discussed above, the lifting propellers 10 are mounted along spars 12 which run fore-to-aft. The spars 12 are suspended at each end by wings 14a–b and evenly spaced laterally there along.

Due to the distributed control and the high level of redundancy, neighboring vertical lift propellers 10 will automatically compensate for the catastrophic failure of one or more VTOL cells 40. Additionally, because of the redundant or "cellular" construction of the VTOL system on the aircraft 100, maintenance is greatly simplified. Each VTOL cell 40 (inclusive of propeller 10 with electric motor 30, and intelligent controller 80) is designed as a "swappable" component. (See exploded view of FIG. 3).

Forward flight is initiated by gradually applying power to the forward thrusters 20 and gradually de-powering the vertical lift propellers 10 as aerodynamic wing lift is developed. When the fixed wings 14a–b have developed sufficient lift such that the 2-blade vertical lift propellers 10 are no longer needed, the blades of the propellers 10 are aligned underneath (See FIG. 4) or enclosed within (See FIG. 5) the fore to aft spars 12 allowing the aircraft 100 to take on a low drag configuration for forward flight. At FIG. 2B the VTOL aircraft is shown in forward-flight position with lifting propellers 10 aligned with or enclosed within the spars 12.

FIG. 3 is an enlarged perspective illustration of VTOL cell 40 (comprised of the vertical lifting propeller 10, motor 30 and intelligent controller 80) deployed for vertical take off and landing mode. As illustrated, the lifting propeller 10 and spar 12 are disposed downwardly, and the lifting propeller 10 is exposed with its propeller protruding beneath the spar 12. As described more fully below, hover pitch and roll is controlled by varying the power to the appropriate lifting propellers 10. For instance (again referring to FIGS. 1–2) if the nose 101 of the aircraft 100 is pitching down, the aircraft 100 can be returned to level by increasing the net power to the vertical lift propellers 10 located toward the front of the aircraft 100 or by decreasing the net power to the propellers 10 in the rear of the craft, or by a combination thereof. Forward flight is initiated by gradually applying power to the forward thrusters 20 (FIG. 1) and gradually de-powering the vertical lift propellers 10. As forward flight speed increases and the lift generated by the wings 14 increases, power to the vertical lift propellers 10 is decreased until all necessary lift is being generated by the wings. When the vertical lift propellers 10 are no longer needed they are brought inline with the spars 12 so that they present minimal drag to the craft.

Figure 4:
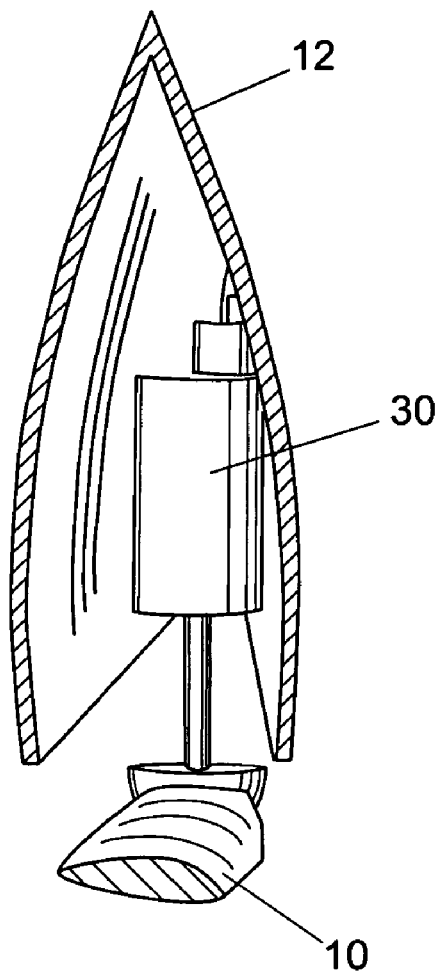
FIG. 4 is an enlarged cross-section illustration of a lifting propeller 10 aligned with the spar 12 to allow high efficiency forward flight.
Figure 5:
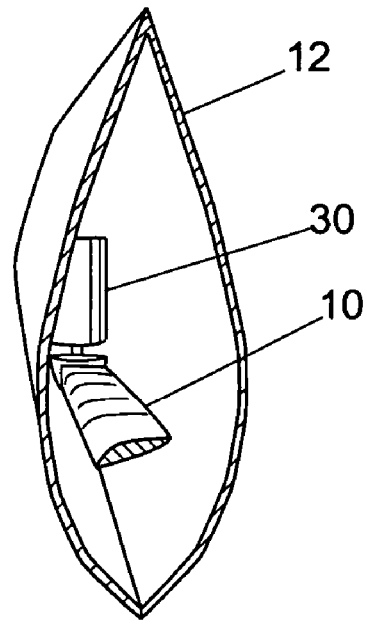
FIG. 5 is an enlarged perspective illustration of the spar 12 of FIGS. 3 and 4 closed to completely envelop the lifting propeller 10 with propeller, thereby further reducing drag.

FIG. 4 is an enlarged perspective illustration of lifting propeller 10 aligned with the spar 12 for minimal drag in forward flight. Drag may be reduced by designing the cell 40 (including the propeller 10, motor 30 and motor controller 80) to retract into the spar 12. If further drag reduction is desired, the spar 12 can be designed to fully enshroud the propeller 10 closing into a low drag aerodynamic shape (See FIG. 5).

A more detailed description of the control system and method of operation for accomplishing vertical take off and landing as well as the transition to forward flight will now be provided.

Control System

The preferred embodiment of the aircraft 100 of the present invention employs a highly redundant distributed control system for vertical take off and landing. As discussed above with reference to FIGS. 1–2, the VTOL propulsion system includes a plurality of VTOL cells 40-1 . . . n, each cell 40 comprising a 2-blade lifting propeller 10, a corresponding intelligent motor controller 80, and corresponding high-efficiency direct drive brushless DC motor 30. In the preferred embodiment, brushless motors 30 and controllers 80 are used in place of traditional brushed motors, thereby eliminating brush and commutator wear and arcing. To the extent that fuel cells (engine/generators) will be used as the power source 50, brushless DC motors 30 are greatly preferred because brush-type motors tend to spark, which is a safety concern due to the hydrogen in the fuel cells and the risk of ignition. A variety of motors 30 will suffice for this application and the selection will depend on the desired size and performance of the aircraft 100. Each vertical lift propeller 10 should ideally be connected directly to the corresponding motor 30 shaft, thereby eliminating the complexity and unreliability of gears, belts or pulleys. Typically, a VTOL cell 40 will consist of a motor 30 with a power rating of approximately 1500 watts or approximately 2 HP and the propeller 10 will be approximately 14 to 18 inches. In the preferred embodiment a one or two person manned aircraft will require approximately 100 VTOL cells 40 and thus, approximately 200 HP. Suitable brushless motors 30 are commercially available through Aveox, Inc., Thin Gap® Motor Technologies and Köhler Elektromotoren GbR (i.e. Actro brushless motor).

As discussed above, each motor 30 for the vertical lift propellers 10 is controlled by an intelligent controller 80. Note that the forward thrusters 20 are also controlled by intelligent controllers 90. Digital Signal Processors designed for motion control such as the Texas Instruments TMS320LF2403a with CAN bus networking capabilities are ideally suited for implementing an intelligent motor controller 80, 90. When combined with an IGBT power stage like the International Rectifier IRAMX16UP60A and appropriate firmware, these controllers 80, 90 can provide a high efficiency, low weight, and low cost networked motor controller.

Figure 6:
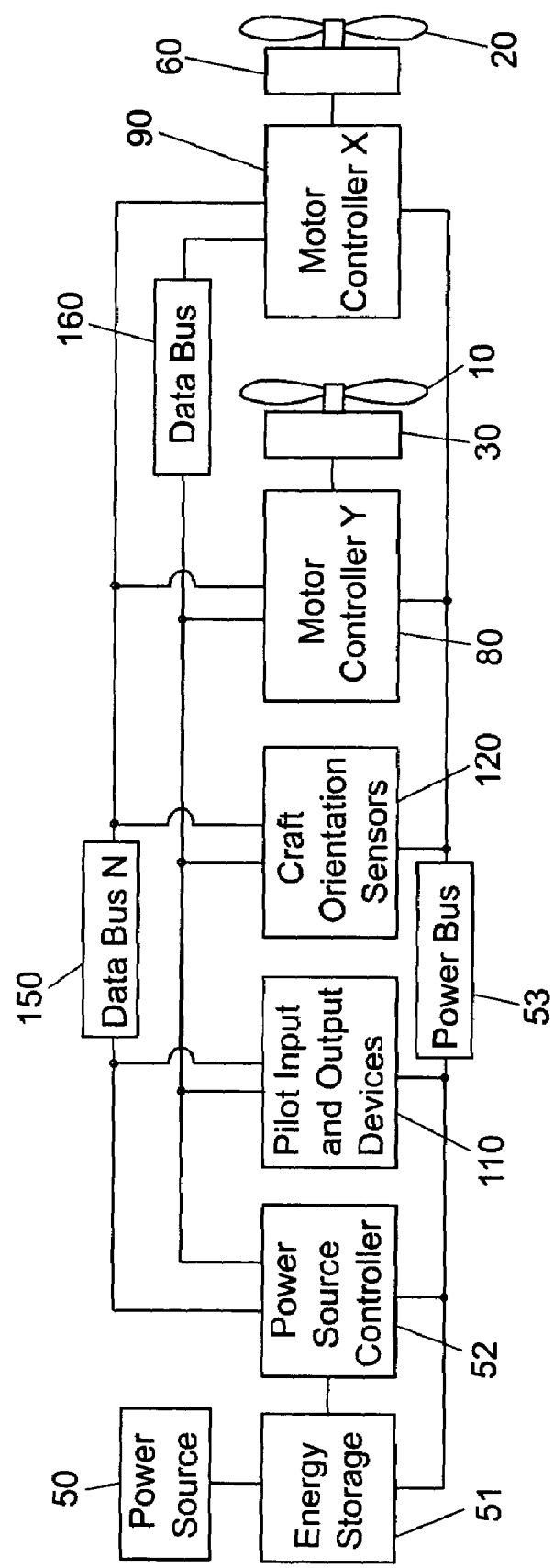
FIG. 6 is a network diagram of the power and data control system according to the present invention.

FIG. 6 is a network diagram of the power and data control system according to the present invention. Referring to FIG. 6, a plurality of lifting propellers 10-1 . . . n and at least one forward thruster(s) 20-1 . . . n as well as their respective motors 30-1 . . . n, 60-1 . . . n are equipped with an intelligent controller 80-1 . . . n, 90-1 . . . n respectively. In the preferred embodiment each of the plurality of controllers 80-1 . . . n (corresponding to the plurality of vertical lift motors 30-1 . . . n and propellers 10 one forward thruster 20-1 . . . n with motors 60-1 . . . n) are connected to a common data bus N (150). The data bus N (150) is also shared with multiple redundant craft orientation and altitude sensors 120, pilot input and output devices 110, and power source controller(s) 52 (i.e. controlling the power the engine/generator 50 and power storage devices 51). If more redundancy is desired each of these devices can also be connected to redundant data buses 160. The common network data bus 150 connects the individual aspects of the aircraft. For example, each of the individual controllers 80, 90 is connected to the data bus 150 and repeatedly broadcast the corresponding propeller's 10 (and forward thruster's 20) current status (i.e. rotational speed and associated motor location) onto the data bus 150. The aircraft's position control electronics (pilot input devices) 110 and the aircraft's position sensor electronics (craft orientation sensors) 120 also repeatedly broadcast the desired and actual craft attitude (pitch, roll, yaw, altitude, and speed) on the network data bus 150. Power source controllers 52 repeatedly broadcast their remaining stored power and power generation capacity from the power generators 50 and energy storage device 51. Each motor controller 80, 90 collects this information and uses it to calculate rotational speed error, pitch error, roll error, yaw error, altitude error, and forward flight speed error, and thereby to determine its next action: the next action being adjustment of power from the power bus 53 to particular vertical lift motors 30 or forward thrusters 20 (i.e. to control rotational speed) in order to control aircraft orientation (i.e. pitch, roll, yaw) as well as altitude and forward flight speed. Using this information (i.e. desired aircraft attitude, actual aircraft attitude, propeller rotational speed and torque, desired forward speed, actual forward speed . . . ), along with the knowledge of the location of the vertical lift propellers 10-1 . . . n and forward thrusters 20-1 . . . n on the aircraft 100, each of the respective motor controllers 80, 90 in combination can intelligently and individually determine the proper individual motor action required to bring the craft 100 to the desired orientation. For example, by comparing the target orientation and altitude with the actual aircraft orientation and altitude, and by comparing a particular vertical lift propeller's 10 current rotational speed with that of the plurality of propellers 10-1 . . . n in its proximate zone, each motor controller 80 can dynamically and independently calculate what its propeller's rotational speed should be in order to correct aircraft orientation.

The intelligent controllers 80, 90 also include self-diagnostics and will indicate to the pilot output devices 110 when they are in need of maintenance or repair. Defective cells 40 can be easily removed from the system and replaced with known good cells. The removed cells 40 can then be serviced off-line, thus allowing the aircraft 100 to stay in service with minimal down time. Since each cell 40 in the vertical lift system is identical, only one type of replacement unit needs to be purchased and stocked.

Method of Operation

Figure 7:
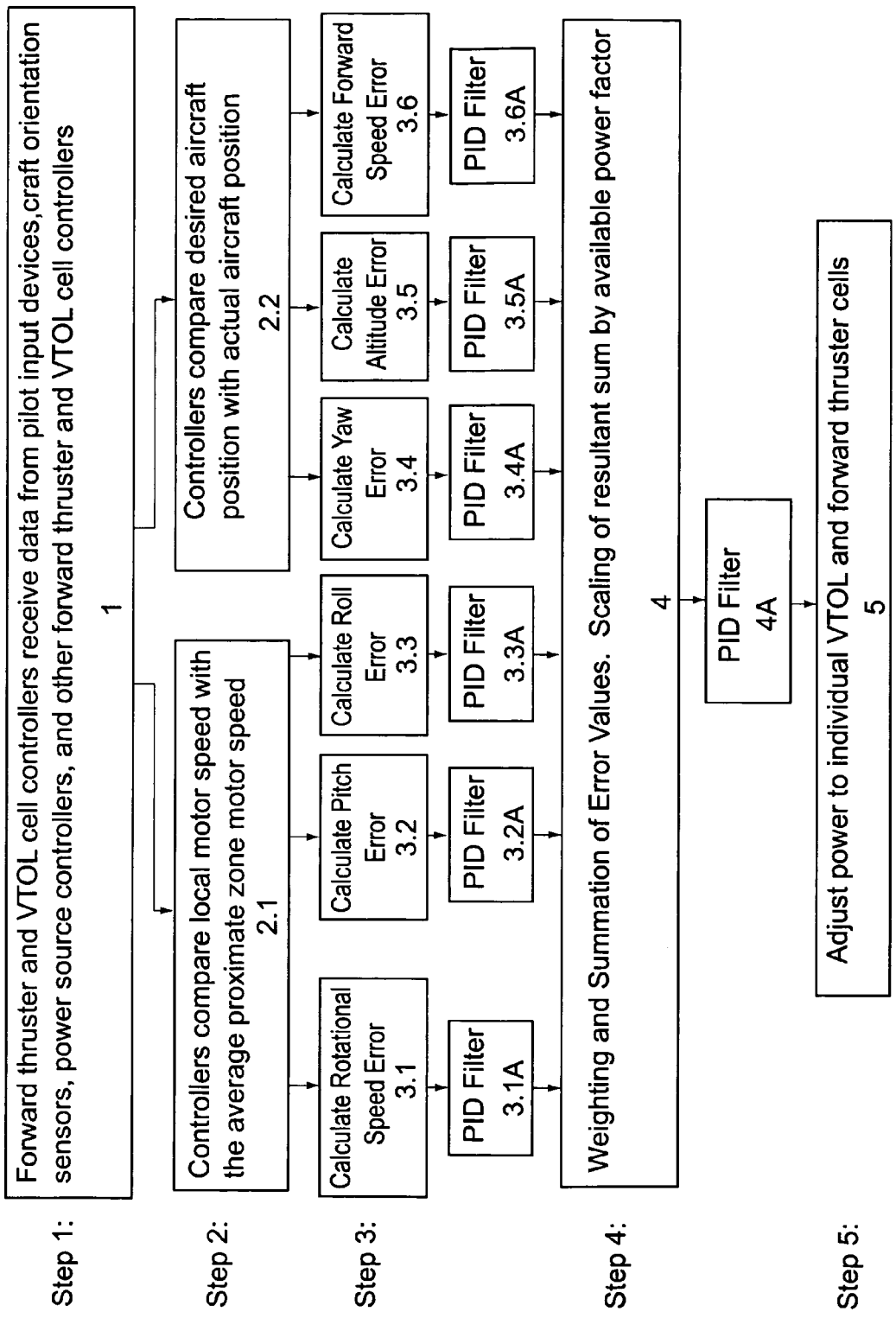
FIG. 7 is a flow diagram of the method of motor control used during vertical flight mode.

FIG. 7 is a flow diagram of the method of operation.

At Step 1 each of the controllers 80, 90 receive data via the bus 150 from pilot input devices 110, craft orientation sensors 120, other controllers 80, 90 and from the power source controller(s) 52 (block 1). The input devices 110 continuously broadcast the selected (desired) target altitude, orientation and flight speed. The craft orientation, altitude, and flight speed sensors 120 also continuously broadcast the actual craft orientation, altitude and flight speed. The power source controller(s) 52 continuously broadcast the remaining available power of their corresponding power sources. Additionally, each of the motor controllers 80, 90 continuously broadcasts its corresponding motor's 30, 60 current operating status (ie. rotational speed and motor location). Each motor controller 80, 90 uses this information to determine its next action.

At Step 2, each controller 80, 90 compares desired aircraft 100 altitude, orientation and flight speed from input sensors 110 with the aircraft's actual altitude, orientation and speed from sensors 120 (block 2.2). In addition motor controller 80 compares local motor 30 rotational speed with average proximate zone rotational speed (block 2.1). Specifically, each controller 80 compares the current speed of its corresponding propeller 10 with that of the other propellers 10-1 . . . n in its zone (i.e. connected to motors 30-1 . . . n in a predetermined area of proximity). At Step 3, using this comparison information, each motor controller 80 continuously calculates the Rotational Speed Error (sub-step 3.1), Pitch Error (sub-step 3.2), Roll Error (sub-step 3.3), Yaw Error (sub-step 3.4) and Altitude Error (sub-step 3.5) and forward speed error (sub-step 3.6). "PID" filters (proportional, integral, and differential) at sub-steps 3.1*a*, 3.2*a*, 3.3*a*, 3.4*a*, 3.5*a*, and 3.6*a* respectively, can be used in this calculation process to give the motors 30 a smoother and more accurate response.

At Step 4, each of the motor controllers 80 weights and sums the filtered data 3.1*a*–3.6*a* and scales the result by the available power reported by the power source controller 52. The calculated information is then filtered with a PID filter (block 4*a*) to determine the amount of power from the engine/generator unit 50 to apply to the respective motor 30 in order to increase or reduce the speed of the corresponding lifting propeller 10.

At Step 5, power from the power source and the power storage device 50, 51 is applied to particular vertical lift motors 30 and/or forward thrusters 20 by their respective controllers 80, 90 to adjust the motor output (i.e. propeller rotational speed) in such a way as to bring the aircraft to the desired position as indicated by pilot input devices 110 (block 5).

The following is a more detailed of explanation of the method of operation for vertical takeoff and landing, vertical to horizontal flight transition, yaw control and power generation and distribution:

A. Vertical Takeoff and Landing Mode:

In vertical take off and landing mode, pitch and roll is controlled by varying the power to the appropriate lifting propellers 10-1 . . . n. For instance, at sub-step 3.2, if the nose of the aircraft 100 is pitching down, the craft 100 can be returned to level by the VTOL cell controllers 80-1 . . . n in the front of the craft 100 increasing the net power supplied to their respective motors 30-1 . . . n, and/or by the VTOL cell controllers 80-1 . . . n in the rear of the craft 100 decreasing the net power to their respective motors 30-1 . . . n. Similarly, if the aircraft 100 is rolling, the craft 100 can be returned to level by increasing the net power supplied to the motors 30-1 . . . n on the same side and/or by decreasing the net power supplied to the motors 30-1 . . . n on the opposite side. Hover balance is accomplished by the motor controllers 80-1 . . . n independently varying the speed of each of the fixed pitch propellers 10-1 . . . n based on the control algorithms (Steps 1–5) mentioned above. Consequently, no complex or failure prone mechanical rotor pitch control linkages are needed in order to maintain stable vertical lift and hover. Instead, the only moving parts (parts which are subject to mechanical wear) in the propulsion system are the high reliability ball bearings contained in the direct drive brushless DC motor 30 and the propeller 10 itself.

B. Vertical Flight to Horizontal Flight Transition

Since vertical lift is attained by a propulsion system of the present invention which can operate independent of the forward propulsion system (forward thrusters 20), transition from vertical flight to forward flight can occur without the aerodynamic transitional instabilities inherent in systems where the vertical thrust and forward thrust are highly interdependent and tightly coupled (i.e., the V-22 Osprey—see Description of Prior Art for further discussion). As stated above, at Step 1 the plurality of vertical lift motor controllers 80-1 . . . n and the at least one forward thruster controllers 90-1 . . . n receive data via the bus 150 from pilot input devices 110, sensors 120, power source controller(s) 52, and other motor controllers 80-1 . . . n, 90-1. . . . n. At Step two the motor controllers 80-1. . . . n and 90-1 . . . n each compare the desired craft position input by the operator using the pilot input devices 110 (i.e. desired forward movement) and compare it to the current air craft position and speed detected by the craft orientation sensors 120 (i.e. the craft is in hover and is not moving forward). The desired transition from vertical flight to horizontal flight is eventually accomplished at Step 5, by applying power, from power source 50, to the forward thruster propellers 20 while continuing to maintain power to the vertical lifting propellers 10 until such supplied vertical lift is no longer required (i.e. sufficient lift is created by the wings 14a–b). As the forward thrust accelerates the craft 100 forward, wing lift develops. As wing lift develops, less power is required by the vertical lifting propellers 10 to keep the craft 100 at the desired altitude. Thus, the controllers 80-1 . . . n continuously calculate the altitude error as well as other errors at sub-steps 3.1–3.6 and appropriately reduce the power to the vertical lift propellers 10, while the horizontal motor controllers increase the power to the forward thrusters 20, as necessary. Since vertical and horizontal thrust can be generated and controlled independently, the transition has no "dead" zones or unstable regions. Additionally, if at any time the craft 100 is operated improperly so that the wings 14a–b are caused to stall (failing to produce lift), the vertical thrusting motors 30-1 . . . n can be brought to full power in a matter of seconds and full control of the craft 100 can be easily regained.

Due to the arrangement of forward thrusters 20 and power source 50, the VTOL aircraft 100 of the present invention is also capable of taking-off and landing as a conventional airplane. More significantly, it is capable of taking-off and landing as a conventional airplane using only partial power. This is possible because the power available from the power source 50 is that power required for hover and is significantly greater than the power required for forward flight.

C. Hover Yaw Control

Figure 8:
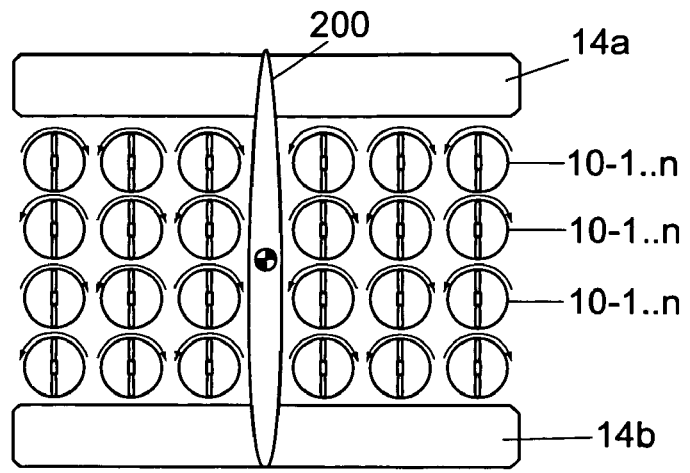
FIG. 8 is a composite illustration of three exemplary approaches to yaw control.
Figure 8:
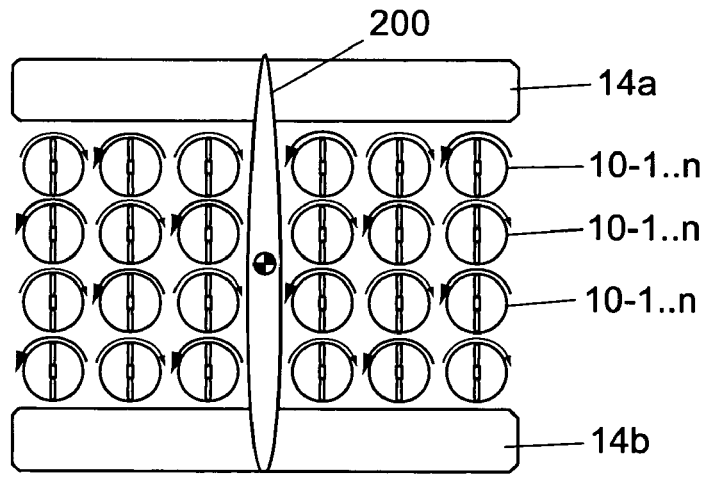
Figure 8:
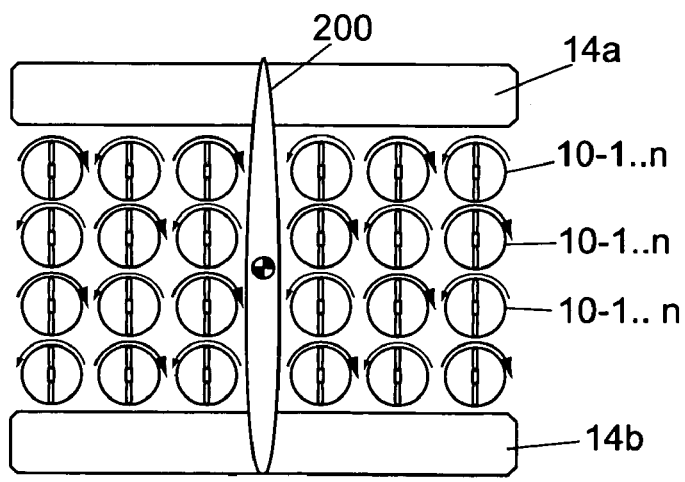

Hover yaw control can be accomplished in several ways, one of which is shown by the composite Yaw Control Drawings of FIG. 8. As seen at position A (top), by rotating half of the propellers 10-1 . . . n in the counterclockwise (ccw) direction and the other half in the clockwise direction (cw) a zero yaw moment is obtained when the yaw moment contribution of all the propellers 10-1 . . . n sums to zero. If a yaw moment is needed in order to alter the yaw orientation of the craft 100, a yaw moment can be created by applying an increased level of power to the propellers 10-1 . . . n rotating in the clockwise and/or a decreased level of power to the propellers rotating in the counterclockwise (or visa versa). Specifically, if the propellers 10-1 . . . n which are rotating in the counter clockwise direction are driven by their respective motors 30-1 . . . n with a net power that is higher than the net power of the motors 30-1 . . . n rotating in the clockwise direction, a clockwise moment will result as seen at position B (middle). In the opposite case a counterclockwise moment will result as seen at position C (bottom). Thus, by controlling the net power to the counter rotating propellers 10-1 . . . n in this manner yaw control can be attained.

Figure 9:
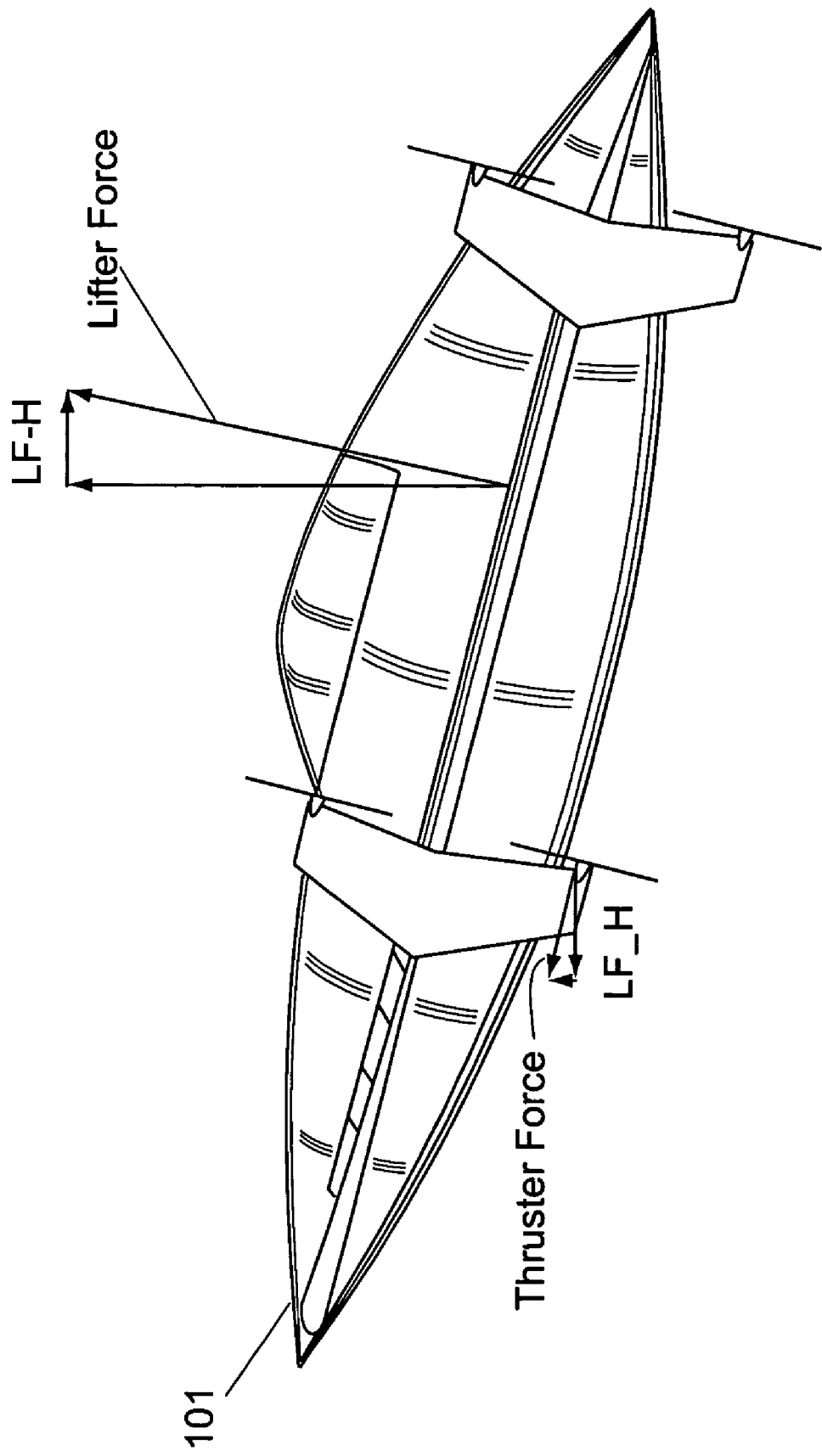
FIG. 9 illustrates an alternative method for obtaining yaw control.

FIG. 9 illustrates an additional method for obtaining yaw control which may be used simultaneously with the yaw control method illustrated in FIG. 8 or it may be used exclusively. This additional method consists of bringing the craft 100 into a pitch position where the nose 101 of the craft 100 is slightly elevated. The horizontal component of the thrust LF_H created by the fixed-position vertical lifting propellers 10-1 . . . n, when the nose 101 is elevated, will exert a rearward force on the craft 100. In order to keep the craft 100 in a static position, the forward thruster propellers 20 must then be energized. Specifically, the power to the forward thrusters 20 must be increased to an energy level where the total forward thrust exerted by the horizontal thruster propellers 20 equals the total rearward force exerted by the lifting propellers 10-1 . . . n. Keeping the forward and reverse forces balanced while unbalancing the thrust of the right and left forward thruster propellers 20 will cause the craft to rotate on its vertical axis and thus control the yaw attitude of the aircraft 100.

D. Forward Flight Pitch and Yaw Control

Because the thrust vectors of the forward thrusters 20 are located both above and below the craft's center of gravity, aircraft pitch in forward flight can be controlled by varying the power to the upper and lower forward thrusters 20. Increasing the power to the lower forward thrusters 20 and decreasing the power to the upper forward thrusters 20, will result in a nose up moment, while maintaining constant forward thrust. Increasing the power to the upper forward thrusters 20 while decreasing the power to the lower forward thrusters 20 will result in a nose down moment, while maintaining constant forward thrust. In this way aircraft pitch can be controlled in forward flight without the necessity of conventional control surfaces.

Similarly, since the thrust vectors of the forward thrusters 20 are located on both the left and right side of the craft's 100 center of gravity, forward flight yaw control can be obtained without the necessity of conventional control surfaces. If power is increased to the forward thrusters on the right side of the craft while power is decreased to the forward thrusters 20 on the left side of the craft, a yaw moment is induced on the craft, while maintaining constant forward thrust. An opposite yaw moment can be created by unbalancing the left and right forward thruster 20 power in an opposite fashion.

Alternately, if desired, conventional control surfaces can be used to control forward flight pitch and yaw.

E. Pilot Interface

The foregoing craft orientation control schemes provide a multitude of advantages. For one, the pilot's role is greatly simplified and he/she is not part of the dynamic control loop. Thus, instead of needing to dynamically stabilize the craft 100, the pilot simply issues commands using the pilot input devices 110 for the craft 100 to go to a particular orientation, altitude and speed, then, based on that command, the controllers 80-1 . . . n and 90-1 . . . n will automatically place the craft 100 in the target orientation, speed and altitude. The skill required to fly the craft 100 is greatly minimized, and the pilot need only set how fast the craft will accelerate to the target orientation, speed and altitude. This allows the pilot to interact with the craft 100 at a higher and less demanding level. Essentially, piloting the craft 100 consists of "telling" the craft the desired flight orientation and how fast to go there. Based on these instructions the craft 100 will automatically seek the desired orientation at the prescribed acceleration rate. The fact that this craft 100 does not require the pilot to be part of the real-time stabilization loop, not only off-loads the pilot, but is also ideally suited for remotely piloted vehicles and automated flight control where real-time pilot response is difficult or impossible. Moreover, since each motor controller 80 operates in a peer-to-peer configuration, the loss of any one controller is not catastrophic. If a single controller 80 is operating improperly, the nearby motor controllers 80-1 . . . n will automatically correct for the error.

F. Power Generation and Distribution

Power for the vertical thrust motors 30 and horizontal thrust motors 60 may be generated through the use of redundant engine and generator sets (power source 50). For example, the engine used can be any internal or external combustion engine with a high power to weight ratio. Alternatively, fuel cells or other electrical generation systems can be used for power generation provided they have a proper power to weight ratio.

In order to accommodate the transient high power demands of vertical takeoff, the power plant 50 may include an energy storage device 51 (see FIG. 6) such as a super-flywheel, super-capacitor, or high-energy batteries.

The electric power generated by the power source 50 is efficiently distributed to the vertical lift propellers 10 and horizontal thrusters 20 with out the need for complex mechanical transmission systems. In order to reduce conduction losses, it is preferred that the power generation plant 50 generate and distribute its power at a high voltage level (approximately 200V to 600V). Using a high voltage power source enables highly efficient power transmission (low "I squared R" losses in the conductors). Additionally, to save on craft weight, the structure of the craft itself can be used for both electrical power transmission and motor heat dissipation, so long as proper electrical isolation is provided.

Figure 10:
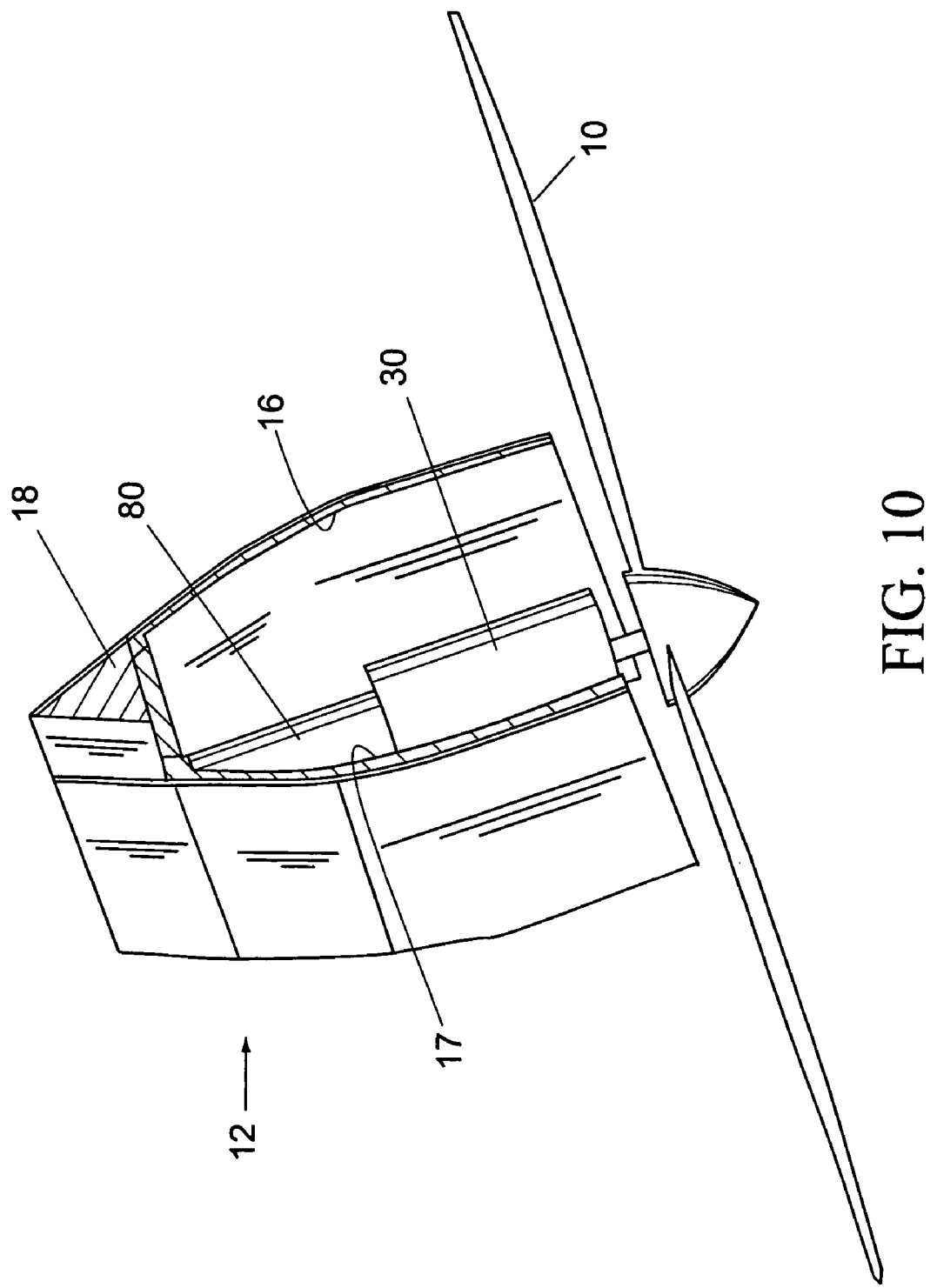
FIG. 10 is a cut-away view of exemplary lifting propellers 10 inside a spar 12, the spar 12 having been adapted for dual-use as a power distribution bus.

FIG. 10 is a cut-away view of an exemplary lifting propeller 10 inside a spar 12, the spar 12, having been adapted for dual-use as a power distribution bus. In this case power to the lifting propellers 10 is transmitted directly through actual aircraft structural elements (provided they are constructed of aluminum or other conductive material and are properly isolated). Specifically, the spar 12 housing is constructed on one side as a positive conductive panel 16, and on the opposing side as a negative conductive panel 17, with the two conductive panels segregated by an insulating edge panel 18. This direct-through-the-body electrical power transmission not only eliminates costly and unreliable mechanical power linkages, but it also eliminates heavy dedicated conductors and thereby reduces the net weight of the craft 100.

High capacity heat dissipation is a natural advantage of the invention. Because the vertical lift motors 30-1 . . . n are spread out over a large vertical lifting area 15 between the fore and aft wings 14a–b of the craft 100 and because they are located in a high velocity air stream on spars 12, the ability to dissipate thermal power is greatly increased. For instance, when a motor 30 is thermally coupled to a supporting fore to aft spar 12, the spar 12 will serve as a large heat sink. Additionally, when the motors 30-1 . . . n are producing mechanical power and thereby generating heat, the spars 12 will also be exposed to high velocity air, thereby providing large amounts of convective cooling. The ability to remove large amounts of heat from the small motors 30-1 . . . n allows the large numbers of small motors 30-1 . . . n to be operated at high power levels, thereby reducing the motor mass needed to lift the craft 100. This also eliminates the need for heavy and costly water-cooled systems.

Alternate Embodiments

The preferred embodiment of the present invention is described above. However, those skilled in the art will recognize that various other aircraft configurations incorporating the unique VTOL propulsion system of the present invention are also anticipated. Specifically, it is anticipated other aircraft configurations, subject only to the constraints reflected in the appended claims, may be adapted to obtain vertical lift through the use of a high plurality of lifting propellers 10-1 . . . n distributed to create a large lifting area 15. Examples of such aircraft configurations are illustrated in FIGS. 11–12.

Figure 11:
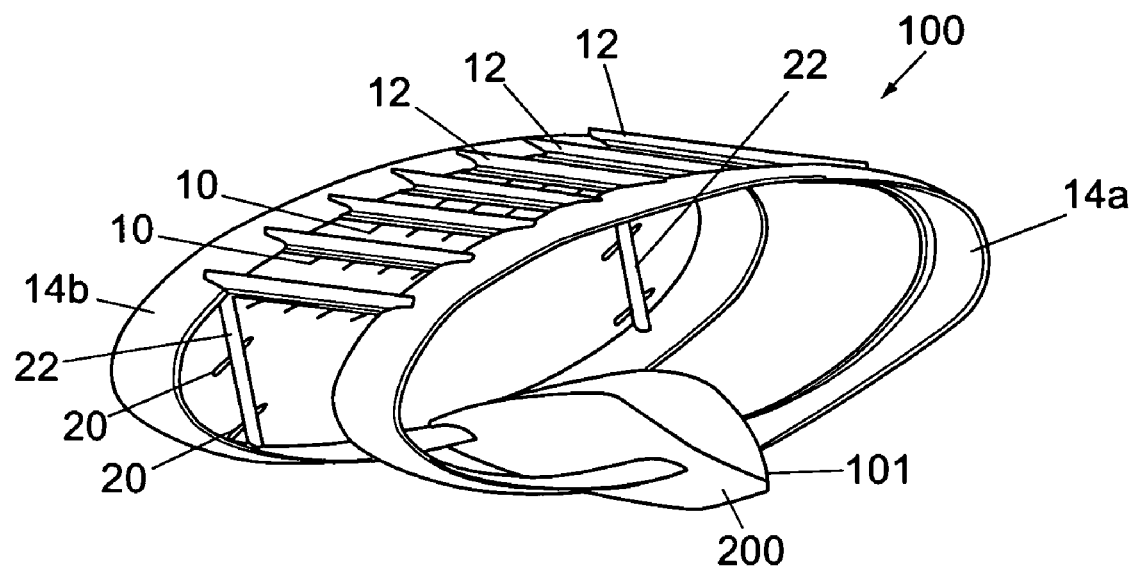
FIG. 11 is a perspective view of an "oval" wing configuration according to an alternate embodiment of the present invention.

FIG. 11 is a perspective view of an "oval" wing configuration. As with the primary embodiment, aircraft 100 comprises fore and aft wings 14a–b are mounted on fuselage 200. Connected between fore and aft wings 14a–b are horizontal spars 12 having a plurality of evenly spaced vertical lifting propellers 10 suspended there from. This alternative embodiment differs from the primary embodiment, only in that the wings 14a–b are symmetrical oval shapes. The oval wings 14a–b extend above the fuselage 200 with the lifting propellers 10 suspended overhead. A plurality of forward thrusters 20 are mounted on vertical spars 22 mounted within aft wing 14b.

Figure 12:
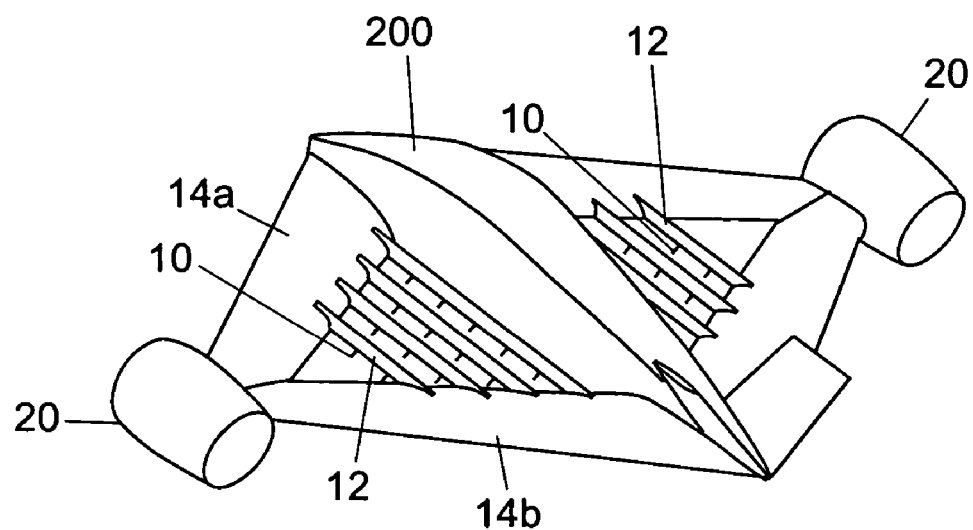
FIG. 12 is a perspective view of a "diamond" wing configuration according to an alternate embodiment of the present invention.

FIG. 12 is a perspective view of a "diamond" wing configuration.

These and other embodiments employ the same distributed system of VTOL cells 40 (including motors 30, controllers 80 and propellers 10) suspended on spars 12 between fore and aft wings 14a–b to achieve vertical take-off and landing as well as highly efficient forward flight when used in combination with forward thrusters 20. They do so in a way that is highly reliable, safe, easy to fly, capable of hovering without the risk of stalling, and capable of flying horizontally with the forward flight speed and efficiency of a conventional fixed wing aircraft.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

We claim:

1. A vertical take-off and landing (VTOL) aircraft, comprising a fuselage; a forward and an aft wing on each side of the fuselage, a plurality of spars on at least one side of the fuselage; each spar having one end attached to one of the forward wings and the other end of each spar attached to at least one of the aft wings, a plurality of vertical take-off and landing (VTOL) cells attached directly to, and in a spaced relationship along each of said spars, each of said VTOL cells further comprising a motor, a motor controller, and a low inertia fixed pitched two blade propeller; at least one forward thruster; at least one power source connected to each VTOL cell motor and to said at least one forward thruster; wherein the VTOL cells are retractable within the spars in order to take on an aerodynamic configuration.

2. The VTOL aircraft of claim 1, wherein said at least one forward thruster includes and is controlled by a corresponding forward thruster controller.

3. The VTOL aircraft of claim 2, wherein said at least one power source is controlled by an at least one corresponding power source controller.

4. The VTOL aircraft of claim 3, wherein said at least one forward thruster controller, said at least one power source controller, and each of said VTOL cell motor controllers include self-diagnostic capabilities.

5. The VTOL aircraft of claim 4, wherein said at least one forward thruster controller, said at least one power source controller, and each of said VTOL cell motor controllers include power bus networking capabilities.

6. The VTOL aircraft of claim 5, wherein said at least one forward thruster controller, said at least one power source controller, and each of said VTOL cell motor controllers are connected to a common network data bus.

7. The VTOL aircraft of claim 6, wherein said at least one forward thruster controller, said at least one power source controller and each of said VTOL cell motor controllers are additionally connected to at least one redundant data bus.

8. The VTOL aircraft of claim 7, wherein said at least one forward thruster controller broadcasts on said common network data bus forward thruster operating status.

9. The VTOL aircraft of claim 8, wherein each of said VTOL cell motor controllers broadcast on said common network data bus cell motor operating status.

10. The VTOL aircraft of claim 9, wherein said at least one power source controller broadcasts on said common network data bus power availability.

11. The VTOL aircraft of claim 10, wherein said VTOL aircraft is further comprised of a plurality of input devices and a plurality of sensors all connected to said common network data bus.

12. The VTOL aircraft of claim 11, wherein said input devices broadcast on said common network data bus target aircraft altitude, orientation and speed data.

13. The VTOL aircraft of claim 12, wherein said sensors broadcast on said common network data bus actual aircraft orientation, altitude and speed data.

14. The VTOL aircraft of claim 13, wherein each of said VTOL cell intelligent motor controllers is programmed to analyze and compare all of said broadcast data on said common data bus to derive pitch error, roll error, yaw error, altitude error and local power error.

15. The VTOL aircraft of claim 14, wherein said local power error comprised of the rotational speed error of said VTOL cell propellers.

16. The VTOL aircraft of claim 15, wherein each of said at least one forward thrust controller is programmed to analyze and compare all of said broadcast data on said common data bus.

17. The VTOL aircraft of claim 16, wherein each of said forward thrust controller is analyzes and compares all of said broadcast data on said common data bus and derives pitch error, roll error, yaw error, altitude error and local power error.

18. The VTOL aircraft of claim 17, wherein said local power error comprises the rotational speed error of said forward thrust propellers.

19. The VTOL aircraft of claim 16, wherein said at least one power source controller is programmed to provide regulated power to one of said busses.

20. The VTOL aircraft of claim 1, wherein said VTOL cell motor is further comprised of a high torque electric motor for providing the aircraft with the ability to respond quickly to load or environment variations with large amounts of control power.

21. The VTOL aircraft of claim 20, wherein said high torque electric motor is a brushless DC motor.

22. The VTOL aircraft of claim 21, wherein each of said VTOL cell motors is an approximately 2 horsepower motor.

23. The VTOL aircraft of claim 1, wherein each of said VTOL cell two-blade propellers are within a range of from 14 to 18 inch propellers.

24. The VTOL aircraft of claim 1, wherein said at least one power source provides power to said VTOL cells during vertical take-off, landing and hovering and wherein, as the VTOL cells create vertical lift, power from said at least one power source is diverted from said VTOL cells to said at least one forward thruster in order to increase forward speed and thereby provide greater vertical lift.

25. The VTOL aircraft of claim 1, further comprised of two or more of said power sources for safety and redundancy.

26. The VTOL aircraft of claim 23, wherein the blades of each of said two-blade VTOL cell propellers rotate and, during forward flight when said VTOL cells are not in use, rotate to align with said spars to take on an aerodynamic configuration.

27. The VTOL aircraft of claim 1, wherein said spars articulate in order to fully enclose said VTOL motor, controller and aligned propeller to provide for a low drag configuration when in forward flight.

28. The VTOL aircraft of claim 27, wherein said first and second wings further comprise vertical fins attached to each wing tip for mounting said forward thrusters.

29. The VTOL aircraft of claim 1, wherein said at least one power source is comprised of an internal combustion engine and a generator.

30. The VTOL aircraft of claim 1, wherein said at least one power source is comprised of a fuel cell.

31. The VTOL aircraft of claim 1, wherein said first wing is swept and cambered to create lift during forward flight, said first and second wings being oriented perpendicular to said fuselage, and said at least one forward thruster comprises a pair of forward thrusters mounted distally on a wingtip of said first and second wings.

32. The VTOL aircraft of claim 1, wherein said forward thrusters are further comprised of pusher propellers.

33. The VTOL aircraft of claim 1, wherein said forward thrusters are further comprised of tractor propellers.

34. The VTOL aircraft of claim 1, wherein said first and second wings are symmetrical, oval-shaped and oriented such that the spars are suspended above the fuselage, and wherein said plurality of forward thrusters are mounted on vertical spars mounted within the oval of the second wing.

35. The VTOL aircraft of claim 1, wherein said first wing is swept and cambered to create lift during forward flight, said second wing is reverse-swept to provide a diamond wing formation.

36. The VTOL aircraft of claim 1, wherein each of said VTOL cells are replaceable for easy maintenance.

37. The VTOL aircraft of claim 1, wherein said spars are positioned above the aircraft's center of gravity so that the VTOL cells mounted on said spars operate near or above said aircraft center of gravity, thereby providing intrinsic pitch and roll stability to the aircraft.

38. The VTOL aircraft of claim 1, wherein said plurality of VTOL cells comprises at least ten VTOL cells and wherein adjacent VTOL cell motor controllers will compensate for a malfunctioning VTOL cell.

39. The VTOL aircraft of claim 1, wherein said plurality of VTOL cells are suspended beneath said spars.

40. The VTOL aircraft of claim 1, wherein said plurality of VTOL cells extend above said spars.

41. The VTOL aircraft of claim 1, wherein electrical power is transmitted via aircraft structural components.

42. The VTOL aircraft of claim 41, wherein said aircraft structural components are said spars adapted as power distribution buses to transmit electrical power.

43. The VTOL aircraft of claim 1, wherein the VTOL motor can be convectively cooled when said spars are exposed to high velocity air.

44. The VTOL aircraft of claim 43, wherein when said spars are thermally coupled to said VTOL motors to improve said convective cooling.

45. The VTOL aircraft of claim 1, wherein adjusting power to each of said VTOL cells individually controls altitude, yaw, roll and pitch during hover and vertical take off and landing.

46. The VTOL aircraft of claim 1, operating with a plurality of said forward thrusters, wherein adjusting power to each of said forward thrusters individually controls altitude, yaw, roll and pitch and forward flight speed during forward flight, without the use of control surfaces.

47. The VTOL aircraft of claim 1, wherein half of said VTOL cell propellers of said aircraft rotate clockwise while the remaining half rotate counterclockwise, and yaw control is achieved by maintaining constant total power to the VTOL cell propellers while applying more of said total power to the said VTOL cell propellers rotating in one direction than to the said VTOL cell propellers rotating in the opposite direction, thus creating a net yaw moment on the said aircraft.

48. The VTOL aircraft of claim 44, wherein said at least one power source controller broadcasts on the common network data bus the remaining available power status and wherein said at least one forward thruster controller and each of said VTOL cell controllers analyze said power availability for altitude, yaw, roll and pitch control and adjust their error corrective outputs accordingly.

* * * * *